United States Patent
Miki et al.

(10) Patent No.: US 6,634,982 B2
(45) Date of Patent: Oct. 21, 2003

(54) AUTOMATIC SPEED CHANGER CONTROLLER, AUTOMATIC SPEED CHANGER CONTROL METHOD, AND RECORDING MEDIUM HAVING PROGRAM FOR METHOD RECORDED THEREON

(75) Inventors: Nobuaki Miki, Anjo (JP); Shigeo Tsuzuki, Anjo (JP); Hiroshi Ishigaki, Anjo (JP); Seiji Sakakibara, Anjo (JP); Masashi Hattori, Anjo (JP); Kazuo Takemoto, Anjo (JP); Masao Kawai, Tokyo-to (JP); Toshihiro Shiimado, Tokyo-to (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/890,423

(22) PCT Filed: Dec. 22, 2000

(86) PCT No.: PCT/JP00/09136
§ 371 (c)(1),
(2), (4) Date: Nov. 5, 2001

(87) PCT Pub. No.: WO01/48399
PCT Pub. Date: Jul. 5, 2001

(65) Prior Publication Data
US 2002/0165064 A1 Nov. 7, 2002

(30) Foreign Application Priority Data
Dec. 24, 1999 (JP) .......................... 11-367656
Dec. 22, 2000 (JP) .......................... 2000-389902

(51) Int. Cl.⁷ ................................ B60K 41/12
(52) U.S. Cl. .................. 477/45; 477/50; 474/28
(58) Field of Search ................. 477/45, 46, 48, 477/50, 120, 97; 701/55, 56, 58, 60, 61, 65; 474/18, 28, 29

(56) References Cited

U.S. PATENT DOCUMENTS

| | | | | |
|---|---|---|---|---|
| 5,069,086 A | * | 12/1991 | Murano et al. | 477/39 |
| 5,218,541 A | * | 6/1993 | Sakakibara et al. | 701/65 |
| 5,431,602 A | * | 7/1995 | Hendriks et al. | 474/28 |
| 5,611,748 A | * | 3/1997 | Kashiwabara | 477/47 |
| 5,669,847 A | * | 9/1997 | Kashiwabara | 477/46 |
| 6,098,005 A | * | 8/2000 | Tsukamoto et al. | 701/65 |
| 6,427,108 B1 | * | 7/2002 | Kanasugi et al. | 701/51 |

FOREIGN PATENT DOCUMENTS

JP 403099945 A * 4/1991 ............ 701/51

* cited by examiner

Primary Examiner—Sherry Estremsky
Assistant Examiner—Tisha D. Lewis
(74) Attorney, Agent, or Firm—Lorusso, Loud & Kelly

(57) ABSTRACT

An automatic transmission control apparatus includes a continuously variable transmission (CVT) which, in turn, includes a primary pulley, a secondary pulley, a belt stretched between the primary pulley and the secondary pulley. The control apparatus further includes a pinching pressure generator for generating a pinching pressure on the belt, a travel environment all detector for detecting the travel environment of a vehicle, a torque variation estimator for estimating the transmission torque variation during travel, and a pinching pressure changer for changing the pinching pressure based on the estimation. The pinching pressure is prevented from constantly increasing because the transmission torque variation during travel is estimated, and the pinching pressure for the belt is changed based on the estimation. Accordingly, the torque transmission efficiency can be increased, and the fuel efficiency can thus be improved.

32 Claims, 11 Drawing Sheets

| GEAR SHIFTING DIAGRAM | ALLOWANCE |
|---|---|
| M1 | $m-\delta 1$ |
| M2 | $m$ |
| M3 | $m+\delta 2$ |
| M4 | $m-\delta 3$ |

| TRAVEL AREA | ALLOWANCE |
|---|---|
| URBAN ROAD | $m$ |
| CONGESTED ROAD | $m-\delta 11$ |
| MOUNTAIN ROAD | $m-\delta 12$ |
| UPHILL ROAD | $m-\delta 13$ |
| DOWNHILL ROAD | $m-\delta 14$ |
| SPEEDWAY | $m-\delta 15$ |

FIG. 14

| TRAVEL AREA/ DRIVING STATE | ALLOWANCE |
|---|---|
| SPEEDWAY+ NO VEHICLE AHEAD | $m-\delta 21$ |
| SPEEDWAY+ VEHICLE AHEAD | $m+\delta 22$ |
| URBAN ROAD | $m$ |
| VEHICLE AHEAD DURING STOP | $m-\delta 23$ |

| ROAD CONDITION | ALLOWANCE |
|---|---|
| ASPHALT ROAD SURFACE OR CONCRETE ROAD SURFACE | m |
| GRAVEL ROAD SURFACE (GRAVEL ROAD) | $m+\delta 31$ |
| ICE AND SNOW ROAD SURFACE (SNOW ROAD OR SNOW AND ICE MIXTURE ROAD) | $m+\delta 32$ |
| SMOOTHLY FROZEN ROAD SURFACE | $m-\delta 33$ |

AUTOMATIC SPEED CHANGER CONTROLLER, AUTOMATIC SPEED CHANGER CONTROL METHOD, AND RECORDING MEDIUM HAVING PROGRAM FOR METHOD RECORDED THEREON

CROSS-REFERENCE TO RELATED APPLICATIONS

This application is a National Phase Application (35 USC 371) of PCT/JP00/09136 and claims priority of Japanese Application No. 11-367656 filed Dec. 24, 1999 and of Japanese Application No. 2000-389902 filed Dec. 22, 2000.

TECHNICAL FIELD

The present invention relates to an automatic transmission control apparatus, an automatic transmission control method and a recording medium with a program for the method recorded thereon.

BACKGROUND ART

Conventionally, in a vehicle equipped with an automatic transmission, the rotation generated by the engine is transmitted to a transmission mechanism, in which gear shifting is performed, and the rotation after the gear shifting is transmitted to a drive wheel to make the vehicle travel.

Automatic transmissions include standard (discontinuously variable) transmissions and continuously variable transmissions. In a standard discontinuously variable transmission, the gear ratio of the transmission mechanism is changed by changing the combination of a gear element for inputting rotation to a planetary gear unit and a gear element for outputting rotation from the planetary gear unit or the like. In the continuously variable transmission, a belt is stretched between a primary pulley and a secondary pulley so that the gear ratio of the transmission mechanism is continuously changed by changing the radial position of the belt on the primary and the secondary pulley, namely, changing the effective diameter of the pulleys. Consequently, the primary pulley and the secondary pulley are provided with a fixed sheave and a movable sheave, respectively, and the effective diameter of each is changed by axially shifting each movable sheave by a driving means as a hydraulic servo, an electric motor or the like.

In the continuously variable transmission, when the belt pinching pressure is high, torque transmission efficiency becomes low. While the belt pinching might be lowered, when the belt pinching pressure is lowered the torque transmitted in the continuously variable transmission may vary over a larger range than suitable when the vehicle encounters bumps on a rough road, or when the accelerator pedal is depressed suddenly. As a result slippage occurs between the primary pulley or the secondary pulley and the belt, and the primary pulley, the secondary pulley and the belt wear to remarkably lower the service life of the continuously variable transmission.

Therefore, the pinching pressure is increased by a certain allowance to prevent slippage from occurring. Where the allowance is m, and the torque to be input to the continuously variable transmission or input torque is $T_1$, the allowance m is set to:

$$M=(a-1) \times T_1$$

Wherein a is a constant, and the constant a is determined, for example, to be 1.04.

A continuously variable transmission in which the allowance m can be changed according to the driving state, driven state or the like of an engine has been disclosed in Japanese Patent Publication No. HEI 6-288448.

In the aforementioned conventional continuously variable transmission, as the pinching pressure is always higher by the allowance m, the torque transmission efficiency is lowered accordingly.

SUMMARY OF THE INVENTION

It is an object of the present invention to provide an automatic transmission control apparatus, an automatic transmission control method, and a recording medium with a program for the method recorded thereon, which solve the problems of the conventional continuously variable transmission, which improve durability of a continuously variable transmission, and which increase the torque transmission efficiency.

Accordingly, the present invention provides an automatic transmission control apparatus which includes a primary pulley, a secondary pulley, a belt stretched between the primary pulley and the secondary pulley, pinching pressure generation means for generating a belt pinching pressure, travel environment detection means for detecting a travel environment of a vehicle, torque variation estimation processing means for estimating the transmission torque variation during travel, and pinching pressure change processing means for changing the pinching pressure based on the estimated results.

In this case, since the transmission torque variation during travel is estimated and the belt pinching pressure is changed based on the estimation, the pinching pressure is prevented from constantly increasing. Accordingly, torque transmission efficiency can be increased and fuel consumption can be improved.

Since the pinching pressure is regulated to correspond to the travel environment, slippage is prevented from occurring between the primary pulley or the secondary pulley and the belt. Consequently, the primary pulley, the secondary pulley and the belt are prevented from wearing and the durability of the continuously variable transmission is thereby improved.

In a preferred embodiment of the automatic transmission control apparatus of the invention, the pinching pressure change processing means increases the belt pinching pressure when the transmission torque tends to vary greatly and lowers the belt pinching pressure when the transmission torque hardly varies.

The torque variation estimation processing means may estimate the transmission torque variation based on the change of a shift schedule selected based on the travel environment or based on the travel area.

The torque variation estimation processing means may estimate that the transmission torque hardly varies in a travel environment for which it is estimated that a sudden change of throttle opening will not occur, e.g., a congested road, a downhill road, or an expressway.

In a preferred embodiment of the automatic transmission control apparatus of the invention, furthermore, the travel environment includes at least a travel area and the driving state. The torque variation estimation processing means estimates the transmission torque variation based on at least either the travel area or the driving state.

In one embodiment of the automatic transmission control apparatus of the invention, the torque variation estimation processing means estimates that the transmission torque will tend to vary easily in a travel environment where it is estimated that the throttle will be open a medium to high degree and the accelerator will be turned on and off frequently.

The travel environment where it is estimated that the throttle will be open a medium to high degree and the accelerator will be turned on and off frequently may be, for example, a mountain road or an uphill grade.

In another preferred embodiment of the automatic transmission control apparatus of the invention, the torque variation estimation processing means estimates that the transmission torque will hardly vary in a travel environment where it is estimated that there is a small possibility of sudden acceleration, for example, where there is no vehicle ahead during travel on an expressway and where there is a vehicle ahead during a stop.

In still another preferred embodiment automatic transmission control apparatus of the invention, the torque variation estimation processing means estimates that the transmission torque will tend to vary easily in a travel environment where it is estimated that there is a large possibility of sudden acceleration, for example, where there is a vehicle ahead during travel on an expressway.

Preferably, the travel environment includes at least a road surface condition and the torque variation estimation processing means estimates the transmission torque variation based on the road surface condition.

In another embodiment of the automatic transmission control apparatus of the invention, the torque variation estimation processing means estimates that the transmission torque will tend to vary easily in a travel environment where it is estimated that the reaction force received from the road surface will be large, for example, where the road surface is a gravel road surface or an ice and snow-covered road surface.

Preferably, the torque variation estimation processing means estimates that the transmission torque will hardly vary in a travel environment where it is estimated that the reaction force received from the road surface will be small, e.g., a smoothly frozen road surface.

In still another embodiment of the automatic transmission control apparatus of the invention, the travel environment detection means detects the travel environment based on operation information.

The control method of the present invention comprises the steps of detecting travel environment of the vehicle, estimating the transmission torque variation during travel based on the detected travel environment, and changing the belt pinching pressure based on the results of the estimation.

The present invention also provides a machine readable medium having, encoded thereon, a program for the automatic transmission control method which detects a travel environment of the vehicle, estimates the transmission torque variation during travel based on the detected travel environment, and changes the belt pinching pressure based on the results of the estimation.

BRIEF DESCRIPTION OF THE DRAWINGS

FIG. 14 shows a correction value table used in the second embodiment of the invention.

DESCRIPTION OF THE PREFERRED EMBODIMENTS

Figure 1:
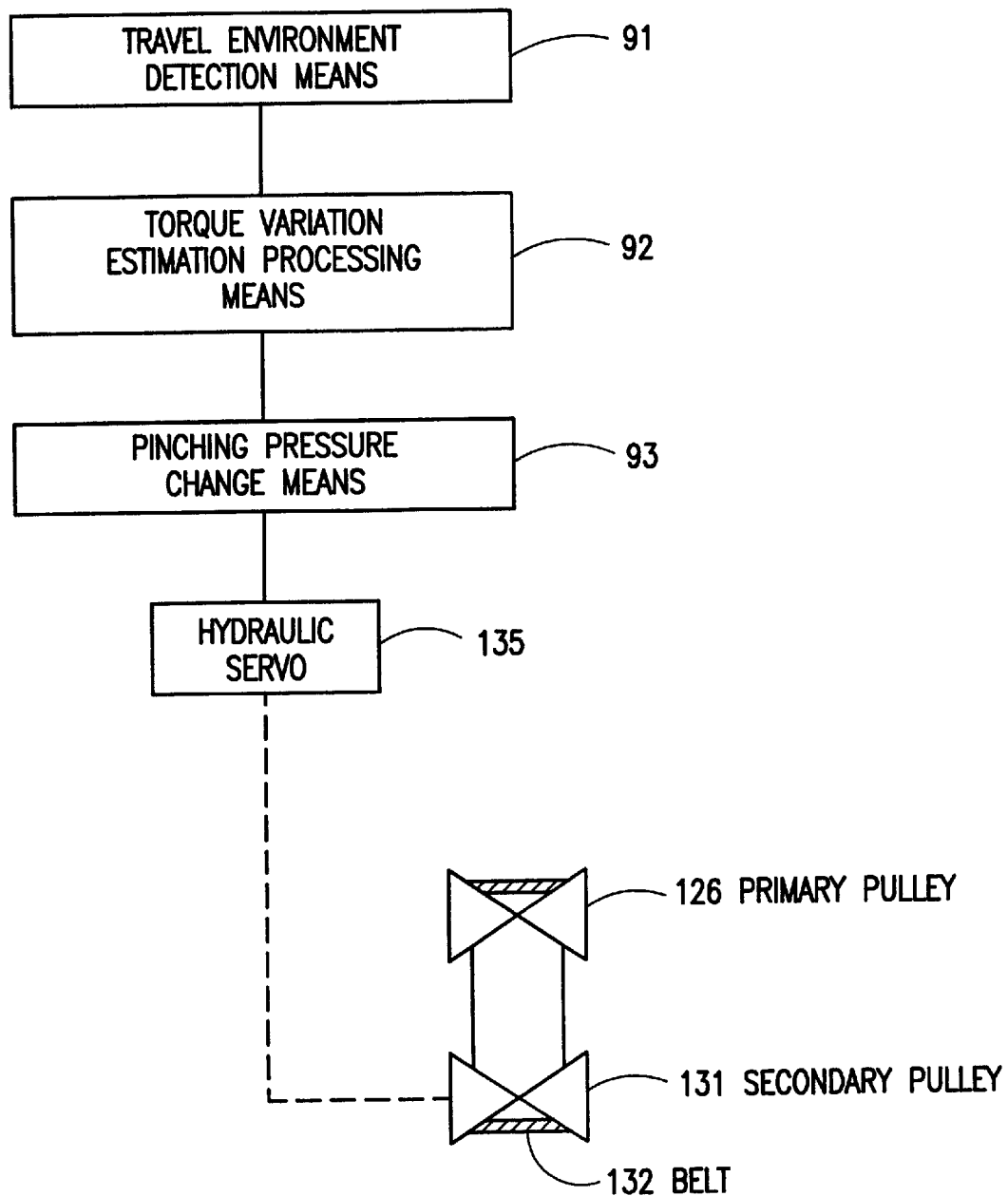
FIG. 1 is a block diagram of an automatic transmission control apparatus in a first embodiment of the invention.

Now, preferred embodiments of the present invention will be described in detail by referring to the drawings. Here, a continuously variable transmission will be described.

FIG. 1 shows a primary pulley 126, a secondary pulley 131, a belt 132 stretched between the primary pulley 126 and secondary pulley 131, a hydraulic servo 135 as pinching pressure generation means for generating pinching pressure for the belt 132, travel environment detection means 91 for detecting the travel environment of a vehicle, torque variation estimation processing means 93 for estimating transmission torque variation during travel, based on the detected travel environment, and pinching pressure change processing means 93 for changing the pinching pressure based on the results of the estimation.

Figure 2:
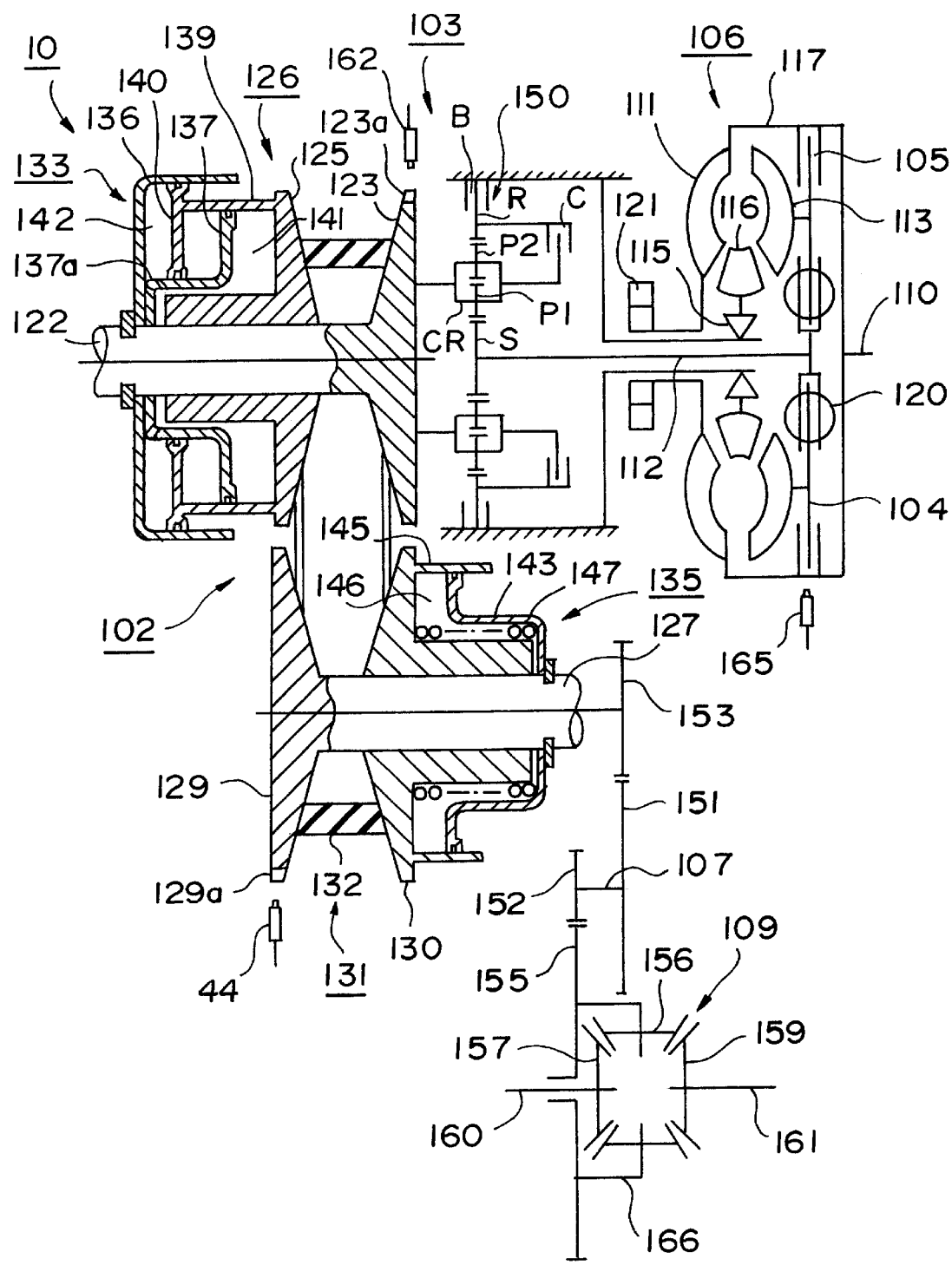
FIG. 2 is a schematic diagram of a continuously variable transmission in the first embodiment of the invention.

As shown in FIG. 2, a continuously variable transmission 10 comprises a belt type transmission mechanism 102, a forward/reverse movement switching apparatus 103, a torque converter 106 with a built-in lockup clutch 105, a counter shaft 107 and a differential apparatus 109.

The torque converter 106 comprises a pump impeller 111 coupled with an output shaft 110 of an engine (not shown) via a front cover 117, a turbine runner 113 coupled with an input shaft 112 via a lockup clutch plate 104 and a damper spring 120, and a stator 116 supported through a one-way clutch 115. The lockup clutch 105 is disposed between the input shaft 112 and the front cover 117. An oil pump 121 is coupled with and driven by the pump impeller 111.

The transmission mechanism 102 comprises the primary pulley 126, the secondary pulley 131 and the metallic belt 132 stretched between the primary pulley 126 and the secondary pulley 131. The primary pulley 126 comprises a fixed sheave 123 fixed to a primary shaft 122, and a movable sheave 125 slidably supported for sliding movement along the axis of the primary shaft 122. The secondary pulley 131 comprises a fixed sheave 129 fixed to a secondary shaft 127, and a movable sheave 130 slidably supported for sliding movement along the axis of the secondary shaft 127.

A hydraulic servo 133 serves as a first driving means and has a double piston disposed at the back of the movable sheave 125. A hydraulic servo 135 serves as a second driving means or "pinching pressure generation means" and has a single piston disposed at the back of the movable sheave 130.

The hydraulic servo 133 comprises a cylinder member 136 and a reaction force support member 137 fixed to the primary shaft 122, and a cylindrical member 139 and a piston member 140 fixed to the back of the movable sheave 125. A first oil chamber 141 is formed by the cylindrical member 139, reaction force support member 137 and back surface of the movable sheave 125. A second oil chamber 142 is formed by the cylinder member 136 and the piston member 140.

The first and second oil chambers 141, 142 communicate with each other via a communication hole 137a, so that the hydraulic servo 133 is supplied with the same hydraulic pressure as the hydraulic servo 135. Therefore, the axial force generated by the hydraulic servo 133 is approximately twice the axial force generated by the hydraulic servo 135.

The hydraulic servo 135 comprises a reaction force support member 143 fixed to the secondary shaft 127 and a cylindrical member 145 fixed to the back of the movable sheave 130. The reaction force support member 143, the cylindrical member 145 and the back surface of the movable sheave 130 define one oil chamber 146, and a preload spring is disposed between the movable sheave 130 and the reaction force support member 143.

The forward/reverse movement switching apparatus 103 comprises a double pinion planetary gear unit 150, a reverse brake B and a direct clutch C. In the double pinion planetary gear unit 150, a sun gear S and the input shaft 122 are coupled to each other, a carrier CR supporting first and second pinions P1, P2 and the fixed sheave 123 are coupled to each other, a ring gear R and the reverse brake B are coupled to each other, and the carrier CR and the ring gear R are coupled via the direct clutch C.

A large gear 151 and a small gear 152 are fixed to the counter shaft 107. The large gear 151 meshes with a gear 153 fixed to the secondary shaft 127, and the small gear 152 meshes with a gear 155 fixed to a differential case 166 of a differential apparatus 109. In the differential apparatus 109, revolution of a differential gear 156 supported by the differential case 166 is transmitted to right and left wheel shafts 160, 161 through right and left side gears 157, 159.

Also, a number of projected/recessed portions 123a are formed at equal intervals by gear cutting on the outer periphery of the fixed sheave 123, and a primary pulley revolution speed sensor 162 comprising an electromagnetic sensor fixed to a case (not shown) is disposed so as to face the projected/recessed portions 123a. A number of projected/recessed portions 129a are formed at equal intervals by gear cutting on the outer periphery of the fixed sheave 129, and a secondary pulley revolution speed sensor, that is, a vehicle speed sensor 44 comprising an electromagnetic sensor fixed to the case is arranged fronting the projected/recessed portions 129a. Accordingly, the vehicle speed V representing a vehicle travel condition can be detected by the vehicle speed sensor 44, while the input pulley revolution speed can be detected by the primary pulley revolution speed sensor 162.

Moreover, an engine speed sensor 165 comprising an electromagnetic sensor fixed to the case is arranged in the proximity of the front cover 117, and the engine speed sensor 165 can detect the engine speed $N_E$ representing an engine load.

In the above-described continuously variable transmission 10 the rotation output by the engine is transmitted to the transmission mechanism 102 via the torque converter 106 and the forward/reverse movement switching apparatus 103, and after a gear shift by the transmission mechanism 102, is further transmitted to the differential apparatus 109 via the gear 153, the large gear 151, the small gear 152 and the gear 155. Then, in the forward/reverse switching apparatus 103, when the direct clutch C is engaged with the reverse brake B released, the double pinion planetary gear 150 is put in a directly connected state, so that the rotation transmitted to the input shaft 112 is transmitted as is to the primary pulley 126, and thus the vehicle is moved forward. On the other hand, when the direct clutch C is released with the reverse brake B engaged, the rotation transmitted to the input shaft 112 is reversed and transmitted to the primary pulley 126, thus the vehicle is moved backward.

The hydraulic servo 133 is used to change the effective diameters of the primary pulley 126 and the secondary pulley 131. That is, in the case of performing an up-shift, the hydraulic servo 133 is drained, so that the effective diameter of the primary pulley 126 is enlarged while the effective diameter of the secondary pulley 131 is reduced. As a result, the gear ratio is reduced. In case of a down-shift, hydraulic pressure is supplied to the hydraulic servo 133, the effective diameter of the primary pulley 126 is enlarged, while the effective diameter of the secondary pulley 131 is reduced and, as a result, the gear ratio is increased.

The hydraulic servo 135 is used to apply and change the pinching pressure for the belt 132. That is, when the hydraulic servo 135 is supplied with hydraulic pressure, a pinching pressure corresponding to the hydraulic pressure is generated, and the secondary pulley 131 pinches the belt 132 with the generated pinching pressure between the fixed sheave 129 and the movable sheave 130.

Moreover, first and second hydraulic pressure control valves (not shown) are disposed in the hydraulic pressure circuit, and the hydraulic servos 133, 135 are supplied with hydraulic pressure as regulated by the first and second hydraulic pressure control valves, respectively. A solenoid signal generated by the automatic transmission control section described below is sent to the solenoids of the first and second hydraulic pressure control valves.

In this embodiment, the hydraulic servo 133 is used to change the effective diameters of the primary pulley 126 and the secondary pulley 131, and the hydraulic servo 135 is used to apply and change the pinching pressure on the belt 132. However, the hydraulic servo 135 may be used to change the effective diameters of the primary pulley 126 and the secondary pulley 131, and the hydraulic servo 133 may be used to apply and change the pinching pressure on the belt 132.

Although the hydraulic servos 133, 135 are used as the first and second drive means in this embodiment, one or both of the hydraulic servo 133 and the hydraulic servo 135 can be substituted by an electric motor. In this case, at least one of movable sheaves 125 and 130 is forced to shift in the axial direction by driving the electric motor, so the effective diameters of the primary pulley 126 and the secondary pulley 131 can be changed by adjusting the position of the movable sheave 125, while the pinching pressure on the belt 132 can be changed by adjusting the position of the movable sheave 130.

The automatic transmission control apparatus will now be described with reference to FIG. 3.

Figure 3:
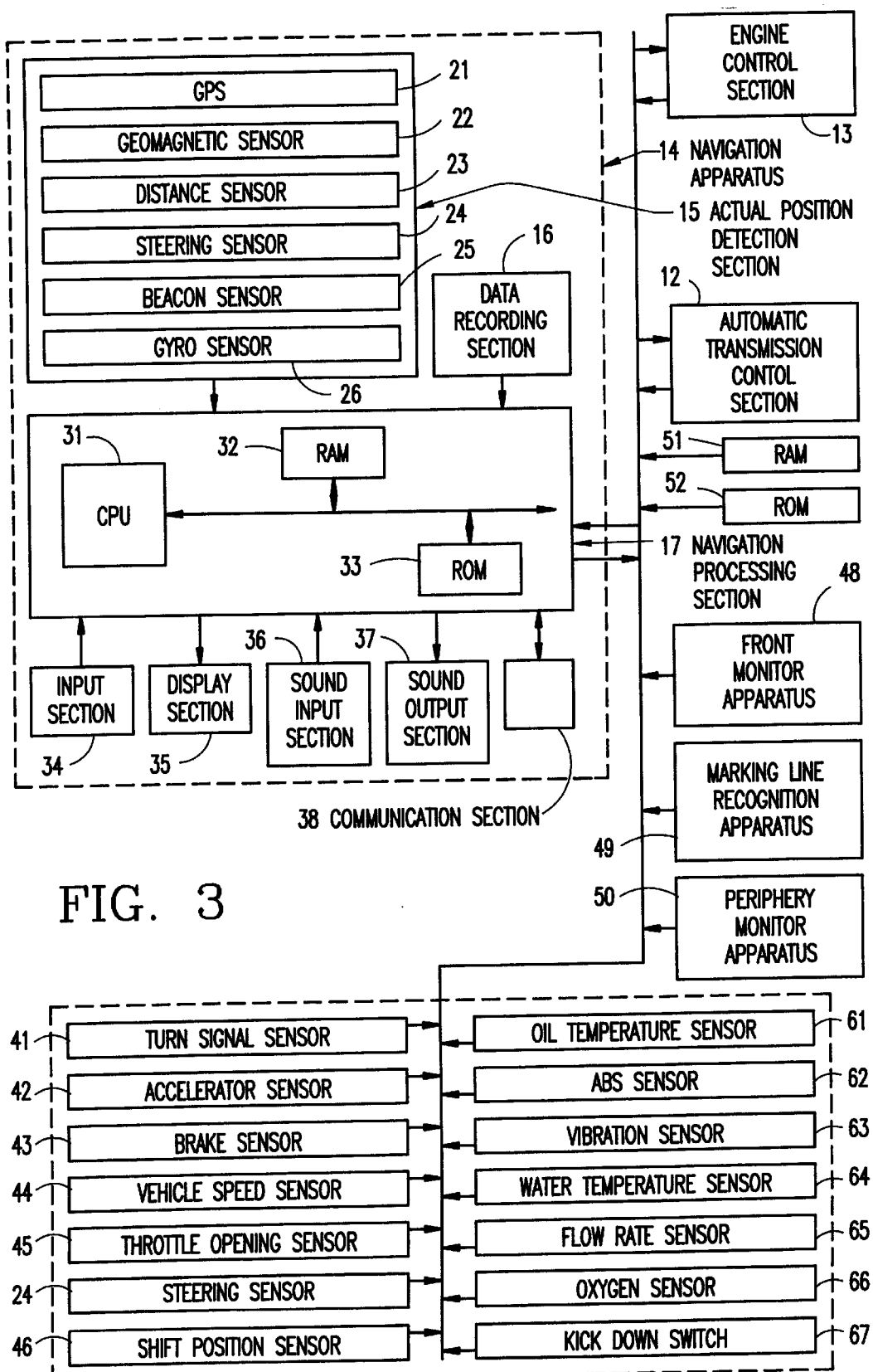
FIG. 3 is a more detailed block diagram of the automatic transmission control apparatus in the first embodiment of the invention.

FIG. 3 shows an automatic transmission control section 40 for controlling the entire continuously variable transmission 10 (FIG. 2), an engine control section 13 for controlling the entire engine (not shown), and a navigation apparatus 14.

FIG. 3 further shows a vehicle/driver operation information detection section 40, and the vehicle/driver operation information detection section 40 comprises a steering sensor 24, a turn signal sensor 41, an accelerator sensor 42 for detecting the accelerator opening a, a brake sensor 43, a vehicle speed sensor 44 for detecting the vehicle speed V, a throttle opening sensor 45 for detecting the throttle opening θ representing the acceleration demanded by the driver, a shift position sensor 46 for detecting the gear shifting range selected by the driver's operation of a shift lever (not shown) or the like, an oil temperature sensor 61 for detecting an ATF temperature, an ABS sensor 62 for detecting a wheel lock/unlock, a vibration gyro sensor 63 for detecting vertical gyro, horizontal gyro or roll angle, a water temperature sensor 64 for detecting engine water temperature, a flow rate sensor 65 for detecting the amount of intake air, an oxygen sensor 66 for detecting oxygen ($O_2$) concentration, and a kick down switch 67 disposed in an operating portion of the accelerator pedal (not shown) or the like. Here, the accelerator sensor 42, brake sensor 43, throttle opening sensor 45 and shift position sensor 46 in combination serve as the driver operation information detection means for detecting parameters related to the driver's operation of vehicle.

FIG. 3 shows a front monitor apparatus 48 for monitoring ahead of the vehicle, a line recognition apparatus 49 for recognizing a line mark representing a lane of road, a periphery monitor apparatus 50 for monitoring the periphery of the vehicle, a RAM 51 and a ROM 52. Here, the RAM 51 and the ROM 52 in combination serve as the recording means. The gear shifting range can be selected from among neutral range (N), forward range (D), low range (L), reverse range (R) and parking range (P). The front monitor apparatus 48 includes a laser radar, a millimeter wave radar, an ultrasonic sensor or a combination thereof, and calculates a headway distance La, a headway time Ta, a speed of approach to a preceding vehicle Va, speed Vb of approach to a stop at a point (point of access from a preference road to a non-preference road, a railway crossing, an intersection where a red signal is blinking, or the like), speed of approach to an obstacle or the like. The periphery monitor apparatus 50 obtains images ahead of the vehicle by use of a camera such as a CCD, a C-MOS or the like, processes the obtained image data, and determines the number of vehicles in the peripheral area, shape of the road ahead, position of a white line, position of the road shoulder, condition of the road surface, traffic signs, presence of a signal, color of the signal, presence of an obstacle, or the like.

The navigation apparatus 14 has a current position detection section 15 for detecting a current position of the vehicle, a data recording section 16 with a recording medium in which various items of data including road data have been stored, a navigation processing section 17 for performing various routines such as involved in navigation processing based on the input information, an input section 34, a display section 35, a sound input section 36, a sound output section 37, and a communication section 38.

The current position detection section 15 comprises a GPS 21, a geomagnetic sensor 22, a distance sensor 23, a steering sensor 24, a beacon sensor 25, a gyro sensor 26, an altimeter (not shown), and the like.

The GPS 21 detects the current ground position of the vehicle by receiving signals from an artificial satellite, the geomagnetic sensor 22 detects the orientation of the vehicle by measuring geomagnetism. The distance sensor 23 detects the distance between certain positions on a road, or the like. As the distance sensor 23, for example, a sensor that measures the rotational speed of an wheel (not shown) for computation of distance based on the rotational speed, a sensor that measures the acceleration for computation of distance by integrating twice the acceleration, or the like can be used.

The steering sensor 24 detects a steering angle, and is, for example, an optical rotation sensor for monitoring rotation of an element rotated by a steering wheel (not shown), a rotation resistance sensor, an angle sensor mounted on the wheel, or the like can be used.

The beacon sensor 25 detects the current position by receiving position information from beacons arranged along a road. The gyro sensor 26 detects the turning angle of a vehicle, namely, gyration angle, and can calculate the orientation in which the vehicle is directed by integrating the gyration angle. As the gyro sensor 26, for example, a gas rate gyro, a vibration gyro, or the like, can be used.

The GPS 21 and beacon sensor 25 can each individually detect the current position. The current position can also be detected by combining the distance detected by the distance sensor 23 with the orientation detected by the geomagnetic sensor 22 and the gyro sensor 26. Furthermore, the current position can also be detected by combining the distance detected by the distance sensor 23 with the steering angle detected by the steering sensor 24.

The data recording section 16 is provided with a database comprising a map data file, an intersection data file, a node data file, a road data file, a picture data file, and a facility information data file containing information of facilities in each area such as hotels, gas stations, sightseeing guidance and the like. In the respective data files are stored, in addition to data for searching for the route, various data for displaying a guidance view along the searched route, a picture, frame view, or the like to show features of the intersection or route, distance to the next intersection, direction of travel at the next intersection or the like, displaying other guidance information on a screen (not shown) of the display section 35. Here, in the data recording section 16, various data for outputting appropriate information by a sound output section 37 is also stored.

In the intersection data file, intersection data concerning intersections is stored, while node data concerning node points is stored in the node data file, and road data concerning roads is stored in the road data file, respectively. The road condition is represented by the intersection data, node data and road data. Here, the node data constitutes at least the position and shape of a road represented by map data stored in the map data file, and is composed of data representing the branching points (including intersections, T-junctions, or the like), node points, and links connecting node points of an actual road. Here, the node point indicates at least the position of bends in a road, and the branching point and node point are represented at least by the latitude, longitude and altitude.

The road data includes width, inclination, cant, bank, road surface condition, number of lanes, spot where the number of lanes is reduced, spot where the road narrows, and other elements constitute a road itself; radius of curvature, intersection, T-junction, entrance to a corner, and other elements constitute corner data; railway crossing, speedway exit ramp, toll gate of a speedway, road category (national road, ordinary road, speedway or the like), urban road, mountain road, uphill road, downhill road, congested road and other elements constitute road attribute data.

The navigation processing section 17 comprises a CPU 31 for controlling the entire navigation apparatus 14, a RAM 32 used as a working memory when the CPU 31 performs various calculations, and a ROM 33 serving as a recording medium containing various programs for performing the search of route to the destination, travel guidance in route, decision of specific section, or the like, in addition to the control program. The input section 34, display section 35, sound input section 36, sound output section 37 and communication section 38 are connected to the navigation processing section 17.

The data recording section 16 and the ROM 33 comprise a magnetic core (not shown), semiconductor memory, or the like. Moreover, for the data recording section 16 and the ROM 33, various recording media such as a magnetic tape, magnetic disk, floppy disk, magnetic drum, CD, MD, DvD, optical disk, IC card, and optical card may also be used.

In this embodiment, various programs are stored in the ROM 33 and various data are stored in the data recording section 16. However, the programs and data may also be stored in a common external recording medium. In this case, for example, a flash memory may be provided in the navigation processing section 17, and the programs and data may be read out from the external recording medium and written into the flash memory. Therefore, the programs and data can be updated by changing the external recording medium. In addition, the control program and the like of the automatic transmission control section 12 can also be stored in the external recording medium. Thus, programs stored in various recording media can be started to perform various routines based on the data.

The communication section 38 is designed to transmit and receive various data through an FM transmission apparatus, a telephone line, or the like, and receives various data including road information such as congestion, traffic accident, D-GPS information for determining detection error of the GPS 21, or the like.

The input section 34 is designed to correct the current position when the travel starts, or input the destination. A keyboard, mouse, bar code reader, light pen, remote control apparatus for remote operation, or the like, arranged separately from the display section 35 can be used as the input section 34. Moreover, the input section 34 may comprise a touch panel for inputting by touching a key or menu shown as an image on the screen of the display section 35.

Operation guidance, operation menu, guidance for operation keys, route to the destination, guidance along the route to be traveled and the like are displayed on the screen of the display section 35. A CRT display, liquid crystal display, plasma display, hologram apparatus for projecting a hologram on the front glass or the like can be used as the display section 35.

The sound input section 36 comprises a microphone (not shown), and can input necessary information by means of sound. In addition, the sound output section 37 comprises a sound synthesis apparatus (not shown) and a speaker, and outputs sound information, for example, guidance information, gear shifting information synthesized by the sound synthesis apparatus from the speaker, to inform the driver. Here, except for sound synthesized by the sound synthesis apparatus, various sounds and various guidance information stored in a recording medium such as a tape memory can be output from the speaker.

In the navigation apparatus 14 thus structured, display processing means (not shown) of the CPU 31 opens a guidance screen on the screen of the display section 35 by executing the display routine to show the current position and a map of the periphery on the guidance screen. Then, when the destination is set by the driver's operation of the input section 34, a route search processing means (not shown) of the CPU 31 searches for the route from the current position to the destination by executing the route search routine. Then, when the route is retrieved, the display processing means opens the guidance screen by executing the display routine, shows the current position, the map of the periphery and the searched route on the guidance screen. Then, the route guidance is started whereby the driver can travel according to the route guidance.

The automatic transmission control section 12 reads, as travel environment, vehicle information and operation information from the vehicle/driver operation information detection section 40, navigation information from the navigation processing section 17, and vehicle environment information from the front monitor apparatus 48 and the periphery monitor apparatus 50. Moreover, the automatic transmission control section 12 reads vehicle periphery information, environment information and display information as necessary for control of the continuously variable transmission 10. Travel environment detection means 91 (FIG. 1) is composed of the vehicle/driver operation information detection section 40, navigation processing section 17, front monitor apparatus 48, line recognition apparatus 49, and periphery monitor apparatus 50.

As the vehicle information, vehicle speed V detected by the vehicle speed sensor 44, engine throttle opening θ detected by the throttle opening sensor 45, engine speed $N_E$ detected by the engine speed sensor 165, engine speed variation calculated based on the engine speed $N_E$, vehicle speed variation (acceleration and deceleration) calculated based on the vehicle speed V, ATF temperature detected by the oil temperature sensor 61, wheel lock/unlock detected by the ABS sensor 62, vertical gyro, horizontal gyro or roll angle detected by the vibration gyro 63, engine water temperature detected by the water temperature sensor 64, intake air amount detected by the flow rate sensor 65, oxygen concentration detected by the oxygen sensor 66, and the like, can be used.

The operation information may include accelerator opening α detected by the accelerator sensor 42, speed of depression Ve of the accelerator pedal calculated based on the accelerator opening α or kick down on/off information, kick down on/off information detected by the kick down switch 67, brake on/off information detected by a brake switch (not shown), force or speed of depression of a brake pedal (not shown) detected by the brake sensor 43, force or speed of depression of the brake pedal detected by a brake hydraulic pressure sensor (not shown), steering angle detected by the steering sensor 24 or a steering speed calculated based on the steering angle, turn signal off, right turn signal on or left turn signal on detected by the turn signal sensor 41, power (sport) mode, normal (economy) mode, snow (hold) mode or auto mode detected by mode switch (not shown), wiper off, intermittent on, continuous (low) on or continuous (high) on detected by a wiper switch (not shown), small light on, head light (low) on, head light (high) on or auto on detected by a light switch (not shown), a gear shifting range detected by an N. S. switch (not shown) and the like can be used.

The navigation information may include shape of a road, road attribute, number of lanes, intersection type, town information or area information stored in the data recording section 16, time (season) detected by the GPS 21, VICS congestion level obtained by the communication section 38, D-GPS information or traffic congestion information obtained by FM multiplex broadcasting, map information obtained by satellite signals, map information, traffic congestion information, leisure information or weather information obtained by a cellular phone (not shown), ETC information, toll fare information, map information, intersection information or town information obtained by a DSRC (not shown), inter-vehicle information detected by the SS radio, and the like.

The vehicle environment information may include headway distance La, headway time Ta, travel lane where preceding vehicle is traveling or obstacle detected by the front monitor apparatus 48, and number of vehicles in the periphery, shape of a road ahead, white line position, road shoulder position, condition of a road surface, road signs, presence of a signal, color of the signal, presence of an obstacle and the like detected the periphery monitor apparatus 50, and the like.

The vehicle periphery information may include an obstacle detected by an ultrasonic sensor (not shown), an obstacle detected by a microwave sensor (not shown), an obstacle detected by a camera (not shown), and the like.

The environment information may include outside temperature detected by an outside temperature sensor (not shown), solar radiation detected by a solar radiation sensor (not shown) and the like.

Further, as the display information, color of the signal detected by the beacon sensor 25 may also be used.

Next, the operation of the automatic transmission control apparatus will be described with reference to FIGS. 4–9. In FIG. 5 to FIG. 9, the abscissa represents the vehicle speed V, and the ordinate represents the engine speed $N_E$.

First, the automatic transmission control section 12 (FIG. 3) judges the control mode selected by the driver. That is, it is judged whether the normal control mode or the adaptive control mode is selected by the driver's operation of a mode selection switch (not shown). When the normal control mode is selected, normal control processing means of the automatic transmission control section 12 performs the normal control processing, that is, reads, as shift control information, the selected gear shifting range, vehicle speed V, throttle opening a and engine speed $N_E$, refers to the gear shifting diagram shown in FIG. 5 stored in the ROM 52, sets the shift schedule corresponding to the gear shifting diagram, and calculates a target value for engine speed $N_E$, that is, target engine speed $N_E^*$ based on the vehicle speed V and throttle opening θ in the selected gear shifting range.

Next, the normal control processing means compares the engine speed $N_E$ with the target engine speed $N_E^*$, generates a gear shift signal based on the results of comparison, and outputs a suitable gear ratio. Then, when the engine speed $N_E$ is higher than the target engine speed $N_E^*$, an up-shift is performed to the appropriate gear ratio, when the engine speed $N_E$ is equal to the target engine speed $N_E^*$, no gear shifting is performed, and when the engine speed $N_E$ is lower than the target engine speed $N_E^*$, a down-shift to the appropriate gear ratio is executed.

Figure 5:
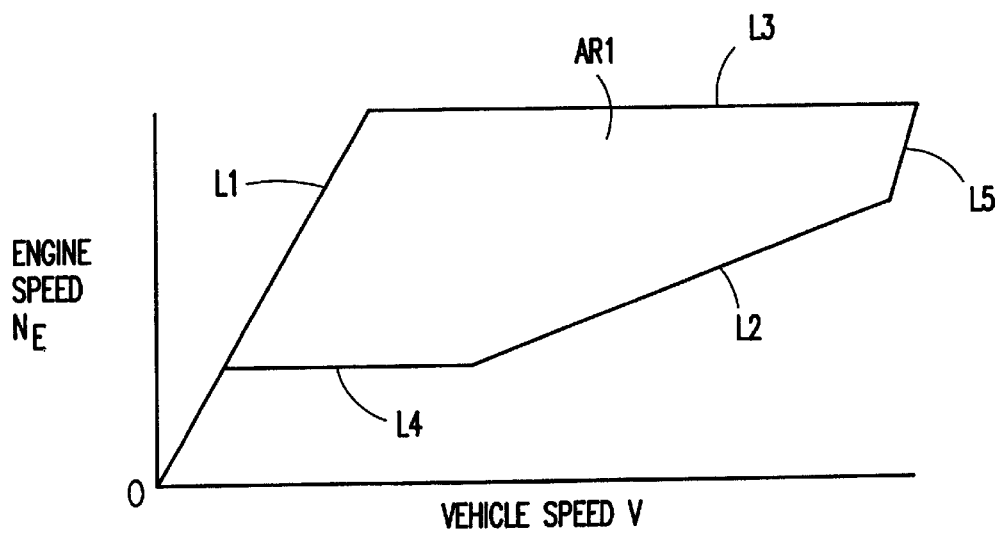
FIG. 5 is a gear shifting diagram referred to in a normal control routine in the first embodiment of the invention.

In the gear shifting diagram shown in FIG. 5, the gear shifting region AR1, which is defined by a line L1 representing the maximum gear ratio, a line L2 representing the minimum gear ratio, a line L3 representing the maximum engine speed $N_E$, or, maximum service speed when the throttle opening θ is 100%, a line L4 representing the minimum engine speed $N_E$ or, minimum service speed when the throttle opening θ is 0%, and a line L5 representing the limit value of the vehicle speed V, is set.

Therefore, when the driver depresses the accelerator pedal (not shown), the vehicle speed V and the engine speed $N_E$ change from the zero point along the line L1 according to the increase of the throttle opening θ. Then, as the driver continues to depress the accelerator pedal by a constant amount, the vehicle speed V increases from the line L1 toward the line L2 with the degree of the throttle opening θ kept constant. Meanwhile, the gear ratio lowers gradually. Then, when the vehicle speed V attains a value on line L2, a stationary state is established, and the vehicle is made to travel at the intended vehicle speed V and engine speed $N_E$.

When the driver releases the accelerator pedal from the stationary state, the vehicle speed V and the engine speed $N_E$ change along the line L2 according to the decrease of the throttle opening θ, and then the vehicle speed V changes along the line L4 until the throttle opening θ becomes 0%. Meanwhile, the gear ratio increases gradually. Then, when the vehicle speed V attains a value on the line L1, the vehicle speed V and the engine speed $N_E$ thereafter change along the line L1, before attaining the zero point.

On the other hand, when the adaptive control mode is selected, adaptive control processing means (not shown) of the automatic transmission control section 12 executes the adaptive control routine, that is, selecting a gear shifting diagram based on a predetermined control logic, corresponding to the travel environment stored in the ROM 52, and setting a shift schedule based on the gear shifting diagram.

The adaptive control processing means reads the travel environment detected by the travel environment detection means 91 (FIG. 1). Then, the travel area judgment means of the adaptive control processing means judges the area where the vehicle travels based on the travel environment, that is, the travel area. In this embodiment, the road attribute is read as the travel environment, and it is judged whether the travel area is, based on the road attribute, an urban road, a congested road, a suburban road, a mountain road, an uphill road, an expressway, or the like.

Then, the shift schedule setting processing means of the adaptive control processing means selects a gear shifting diagram corresponding to the judged travel area, refers to the selected gear shifting diagram, and sets the shift schedule based on the gear shifting diagram.

Figure 6:
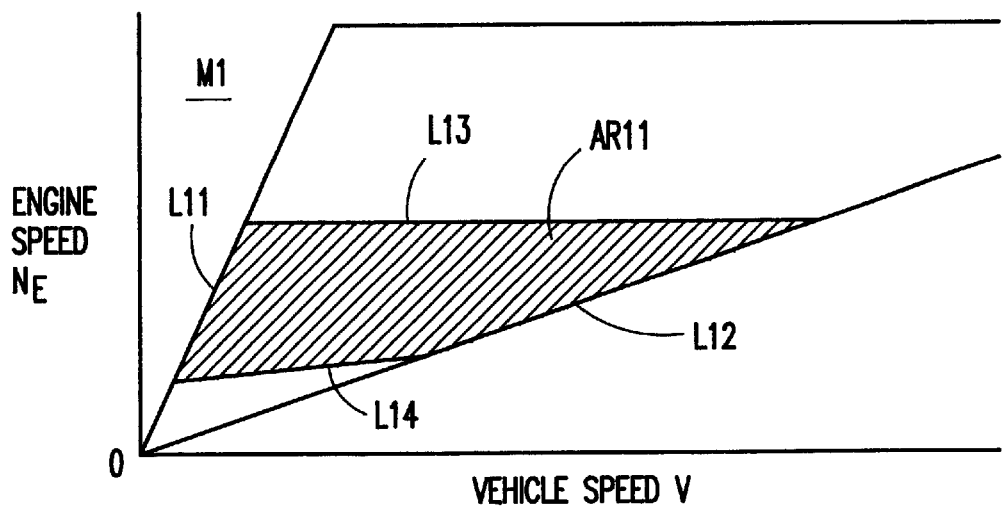
FIG. 6 is a first gear shifting diagram referred to in an adaptive control routine in the first embodiment of the invention.
Figure 7:
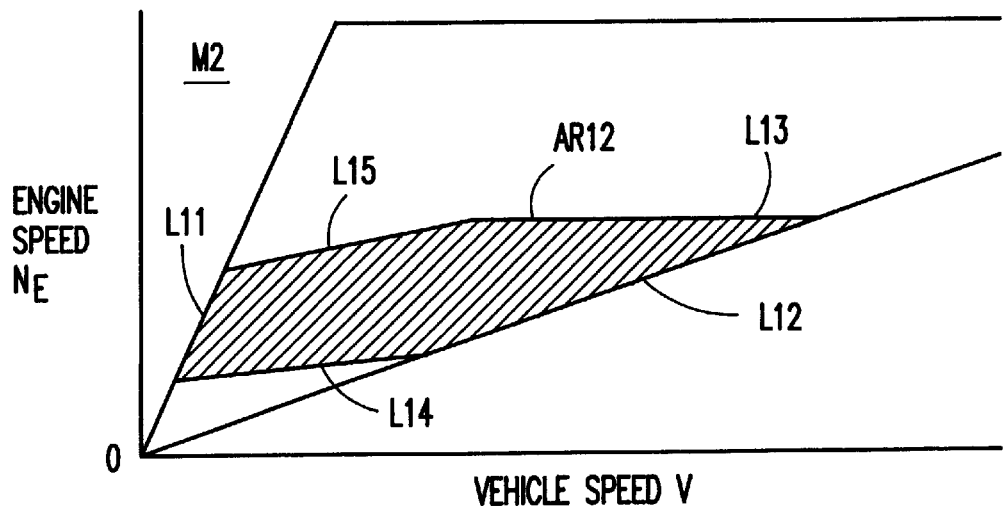
FIG. 7 is a second gear shifting diagram referred to in the adaptive control routine in the first embodiment of the invention.
Figure 8:
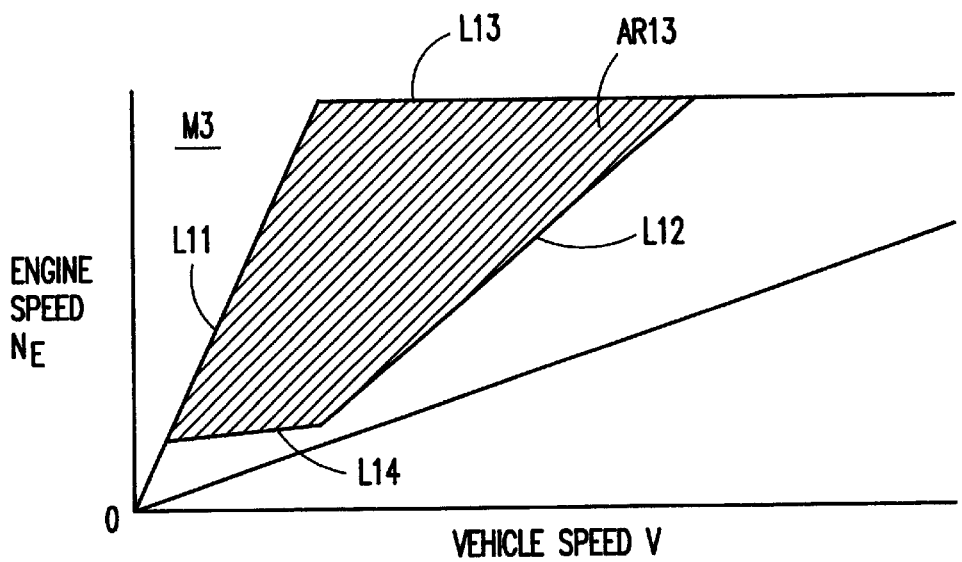
FIG. 8 is a third gear shifting diagram referred to in the adaptive control routine in the first embodiment of the invention.
Figure 9:
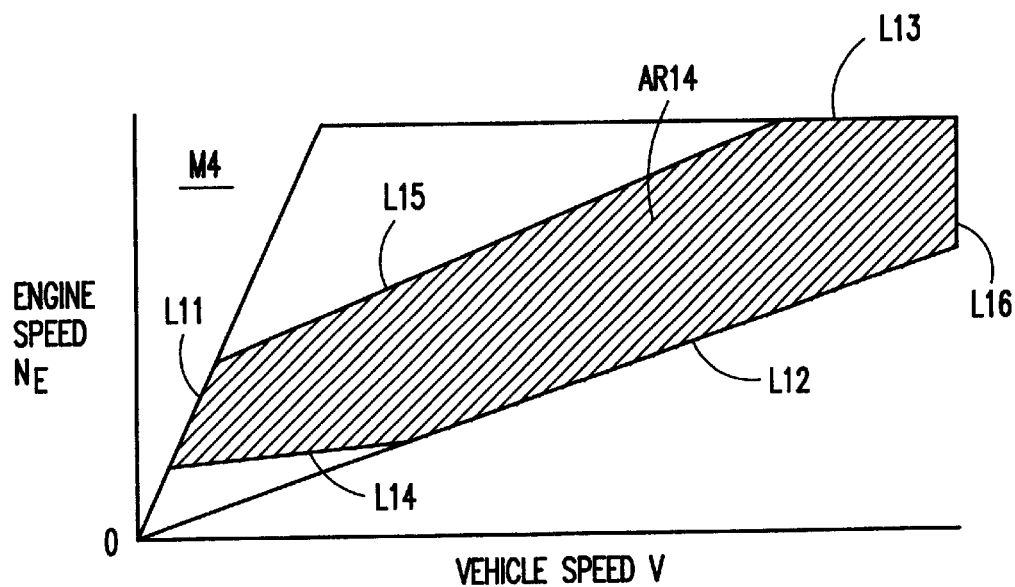
FIG. 9 is a fourth gear shifting diagram referred to in an adaptive control routine in the first embodiment of the invention.

The shift schedule setting processing means selects: for example, a first gear shifting diagram M1 shown in FIG. 6 in the case where the travel area is an urban road or a congested road; a second gear shifting diagram M2 shown in FIG. 7 in the case where the travel area is a suburban road; a third gear shifting diagram M3 shown in FIG. 8 in the case where that the travel area is a mountain road or an uphill road; and a fourth gear shifting diagram M4 shown in FIG. 9 in the case where the travel area is an expressway.

The first gear shifting diagram M1 is appropriate for making the vehicle travel at a medium speed or low speed. Here, a gear shifting region AR11 bounded by the lines L11 to L14 is set so that the engine speed $N_E$ is in a low speed region, the engine speed $N_E$ is set lower than the lines L3, L4, respectively, for the line L13 representing the maximum service speed and the line L14 representing the minimum service speed and, at the same time, the lower the vehicle speed V is for the line 14, the lower the engine speed $N_E$ becomes.

The second gear shifting diagram M2 is appropriate for making the vehicle travel at a medium speed or high speed. Here, a gear shifting region AR12 is set as defined by a line L15 for restricting the gear ratio from increasing when the vehicle speed V becomes equal to or more than a suitable value, in addition to the line L11 representing the maximum gear ratio, L12 representing the minimum gear ratio, and the lines L13, L14. In this case, the vehicle can be made to travel by reducing the gear ratio at a medium speed of 50 km/h or more not including 80 km/h.

The third gear shifting diagram M3 is appropriate for vehicle travel with a large gear ratio and driving force. Here, a gear shifting region AR13 defined by the lines L11 to L14 is set, and the gear ratio of the line L12 is made higher than the theoretical minimum gear ratio of the line L2. As a result, the gear ratio is prohibited from being lowered, and the maximum gear ratio can be achieved even at 50 km/h.

The fourth gear shifting diagram M4 is appropriate for vehicle travel at a high speed. Here, a gear shifting region AR14 is set, which region is defined by the line L15, and a line L16 for inhibiting the vehicle speed from becoming equal to or more than a suitable value, in addition to the lines L11 to L14. In this case, since the maximum gear ratio can be achieved at 80 km/h or more, the engine speed $N_E$ is inhibited from increasing, and noise generation is prevented.

In the continuously variable transmission 10 (FIG. 2), when the pinching pressure for the belt 132 is high, the torque transmission efficiency becomes low. However, if the pinching pressure for the belt 132 is reduced, the transmission torque may vary and exceed a suitable torque when the vehicle is bumped due to a rough road, or when the accelerator pedal is depressed suddenly. As a result, slippage would occur between the primary pulley 126 or the secondary pulley 131 and the belt 132, and thus the primary pulley 126, the secondary pulley 131 and the belt 132 would see increased wear, remarkably lowering the durability of the continuously variable transmission 10.

Therefore, generally, as mentioned above, by setting a suitable allowance m to:

$$m=(a-1)\times T_1$$

based on the input torque $T_1$ and the constant a (=1.4), and increasing the pinching pressure by the allowance m, slippage is prevented.

The allowance m may also be set, as necessary, to:

$$m=(a-1)\times T_1+b$$

Here, b is a constant. Otherwise, the allowance m corresponding to the vehicle speed V, input torque $T_1$, input pulley revolution speed and the like may be calculated beforehand, and the calculated allowance may be mapped and stored in the ROM 52.

However, if the pinching pressure is constantly higher by the allowance m, the torque transmission efficiency is decreased accordingly. Thus, allowance correction processing means (not shown) of the automatic transmission control section 12 makes an allowance correction, and the torque variation estimation processing means 92 of the allowance correction processing means estimates transmission torque variation during travel based on the detected travel environment. Here, the pinching pressure change processing means 93 of the allowance correction processing means corrects the allowance m, and changes the pinching pressure based on the result of estimation by the torque variation estimation processing means 92.

Figure 4:
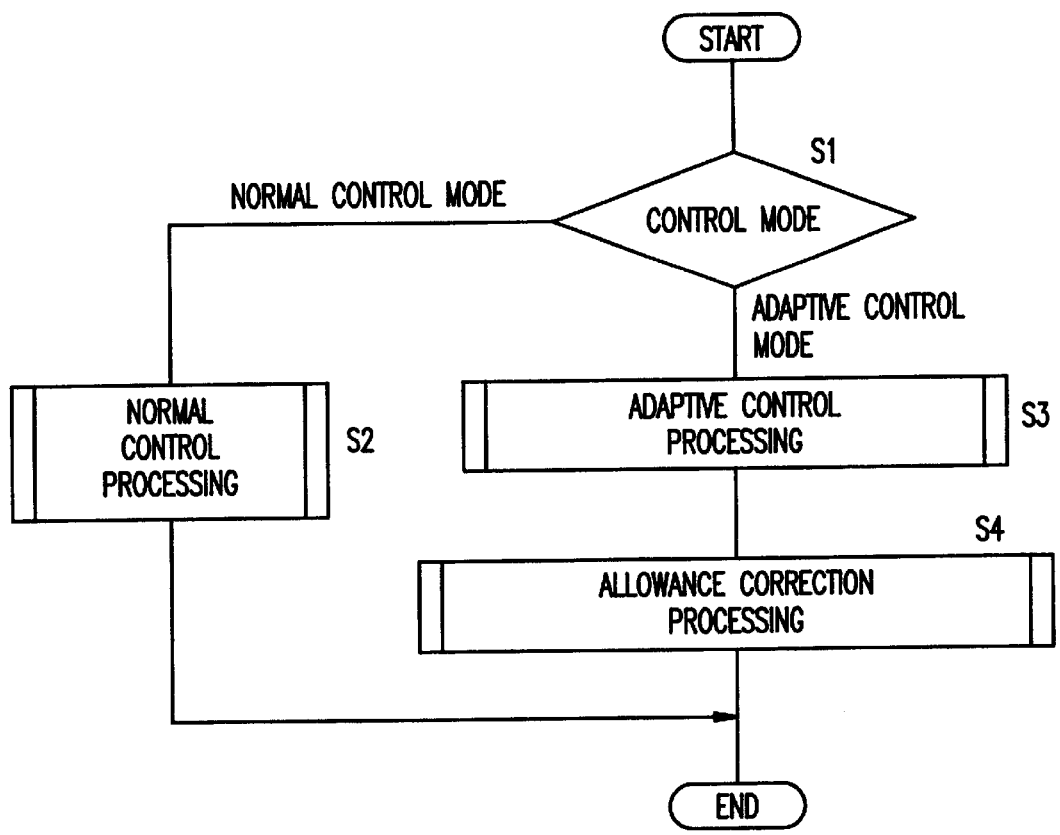
FIG. 4 is a main flowchart of the routine for operation of the automatic transmission control apparatus in the first embodiment of the invention.

Next, the flowchart shown in FIG. 4 will be described.

Step S1: It is judged whether the normal control mode has been selected, or the adaptive control mode has been selected by the driver. In the case that the normal control mode has been selected, the routine proceeds to step S2 and in the case that the adaptive control mode has been selected, the routine proceeds to step S3.

Step S2: The normal control subroutine is executed, and the processing is terminated.

Step S3: The adaptive control subroutine is executed.

Step S4: The allowance correction subroutine is executed, and the processing is terminated.

Figures 10, 11:
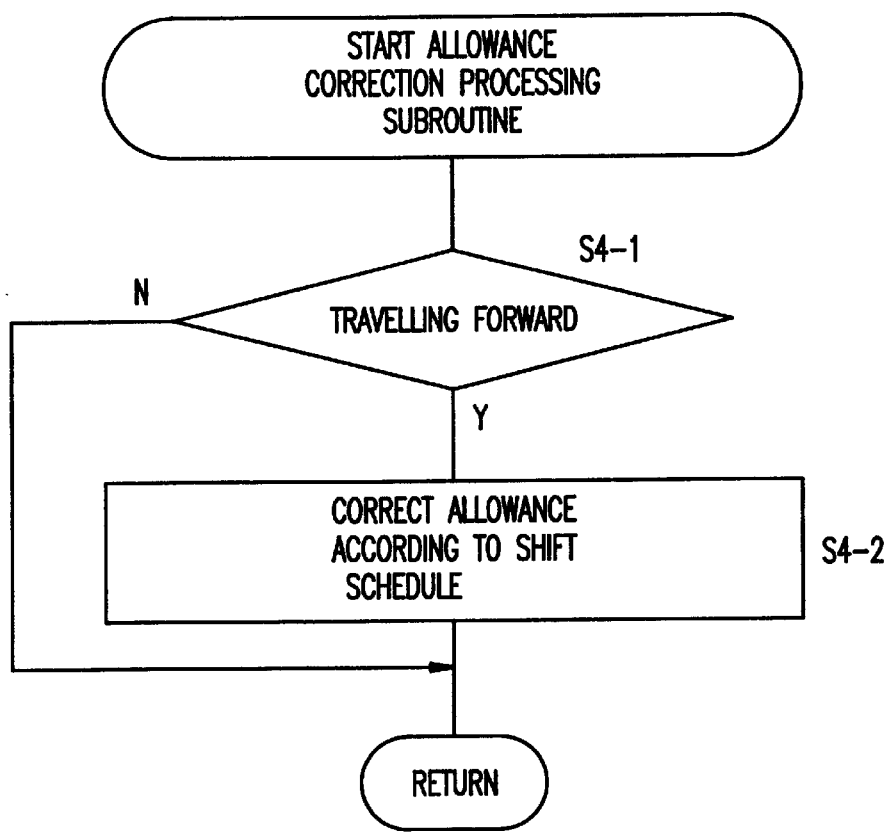
FIG. 10 shows a subroutine for allowance correction in the first embodiment of the invention.
FIG. 11 shows a correction value table used in the first embodiment of the invention.

Next, a subroutine for the allowance correction in step S4 in FIG. 4 will be described with reference to FIGS. 10 and 11.

The torque variation estimation processing means 92 (FIG. 1) judges whether or not the vehicle is traveling forward, and if traveling forward, estimates whether or not the transmission torque will tend to vary easily during travel based on the shift schedule set in the shift schedule setting processing, and how much it will vary if it finds that the transmission torque will tend to vary easily. Then the pinching pressure change processing means 93 corrects the allowance m and changes the pinching pressure for the belt 132 based on the estimation made by the torque variation estimation processing means 92. That is, the pinching pressure is increased when the transmission torque tends to vary easily, and the pinching pressure is decreased when the transmission torque hardly varies. Therefore, the correction value of the allowance m is set with variation of hydraulic pressure supplied to the hydraulic servos 133, 135, variation of engine torque, variation of the performance of the torque converter 106, reaction force received by the wheel from the road surface, margin for inhibiting the engine torque from varying when the accelerator pedal depression amount changes suddenly, and the like, taken into account.

For instance, in the case where the gear shifting diagram selected by the shift schedule setting processing is the first gear shifting diagram M1, it is estimated that the transmission torque hardly varies during travel, the allowance m is corrected by a correction value δ1 and is reduced to m−δ1; in the case where the selected gear shifting diagram is the second gear shifting diagram M2, it is estimated that the transmission torque hardly varies during travel, and the allowance m is not corrected; in the case where the selected gear shifting diagram is the third gear shifting diagram M3, it is estimated that the transmission torque will tend to vary easily during travel, the allowance m is corrected by a correction value δ2 and is increased to m+δ2; and in the case where the selected gear shifting diagram is the gear shifting diagram M4, it is estimated that the transmission torque will hardly vary, the allowance m is corrected by a correction value δ3 and is reduces to m−δ3.

The correction values δ1 to δ3 are set previously in accordance with the degree of the transmission torque variation. In this embodiment, the gear shifting diagram is selected based on the judgment whether the travel area is an urban road, a congested road, a suburban road, a mountain road, an uphill road, an expressway or the like. Therefore, the correction values δ1 to δ3 are set by estimating how the transmission torque will vary in the respective travel areas. The situations where the transmission torque will vary by travel area include: immediately after the change from the deceleration state to the acceleration state; immediately after the change from the acceleration state to the deceleration state; when the steering wheel is turned while the accelerator pedal (not shown) is depressed while passing a preceding vehicle on an expressway; when the steering wheel is turned after depressing the accelerator pedal for acceleration after the vehicle has rounded a curve on a snaking road; and when the accelerator pedal is depressed after the brake pedal is released.

Thus, the pinching pressure is prevented from constantly increasing because the transmission torque variation during travel is estimated to vary the allowance m, i.e., the allowance m is increased when the transmission torque tends to vary easily and the pinching pressure is thereby increased, and the allowance m is decreased when the transmission torque hardly varies and the pinching pressure is thereby lowered. Accordingly, the torque transmission efficiency can be increased, and the fuel efficiency can thus be improved.

Moreover, because pinching pressure is adjusted in accordance with the travel environment, slippage is prevented from occurring between the primary pulley 126 or the secondary pulley 131 and the belt 132. Consequently, wear of the primary pulley 126, the secondary pulley 131 and the belt 132 is reduced and the durability of the continuously variable transmission 10 (FIG. 2) is improved.

Next, the flowchart of FIG. 10 will be described.

Step S4-1: It is judged whether or not the vehicle is traveling forward. If the vehicle is traveling forward, the subroutine proceeds to step S4-2, and if the vehicle is not traveling forward, the subroutine returns to the start.

Step S4-2: The allowance m is corrected according to the shift schedule, and the subroutine returns to the start.

Figure 12:
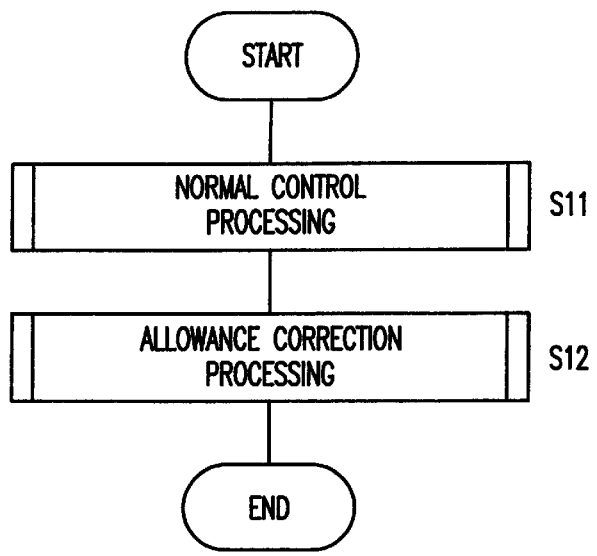
FIG. 12 is a main flowchart of a routine for operation of an automatic transmission control apparatus in a second embodiment of the invention.

A second embodiment of the invention will now be described with reference to FIG. 12. In the second embodiment, a normal control processing means (not shown) of the automatic transmission control section 12 (FIG. 3) performs a normal control processing similar to the first embodiment. Then, allowance correction processing means (not shown) of the automatic transmission control section 12 executes an allowance correction subroutine, estimates, based on the travel environment, whether or not the transmission torque will tend to vary easily during travel, and how much it will vary in the case where it finds that the transmission torque tends to vary easily and corrects the allowance m based on these estimations.

Next, the flowchart of FIG. 12 will be described.

Step S11: The normal control subroutine is executed.

Step S12: The allowance correction subroutine is executed, and the routine of FIG. 12 is terminated.

Figure 13:
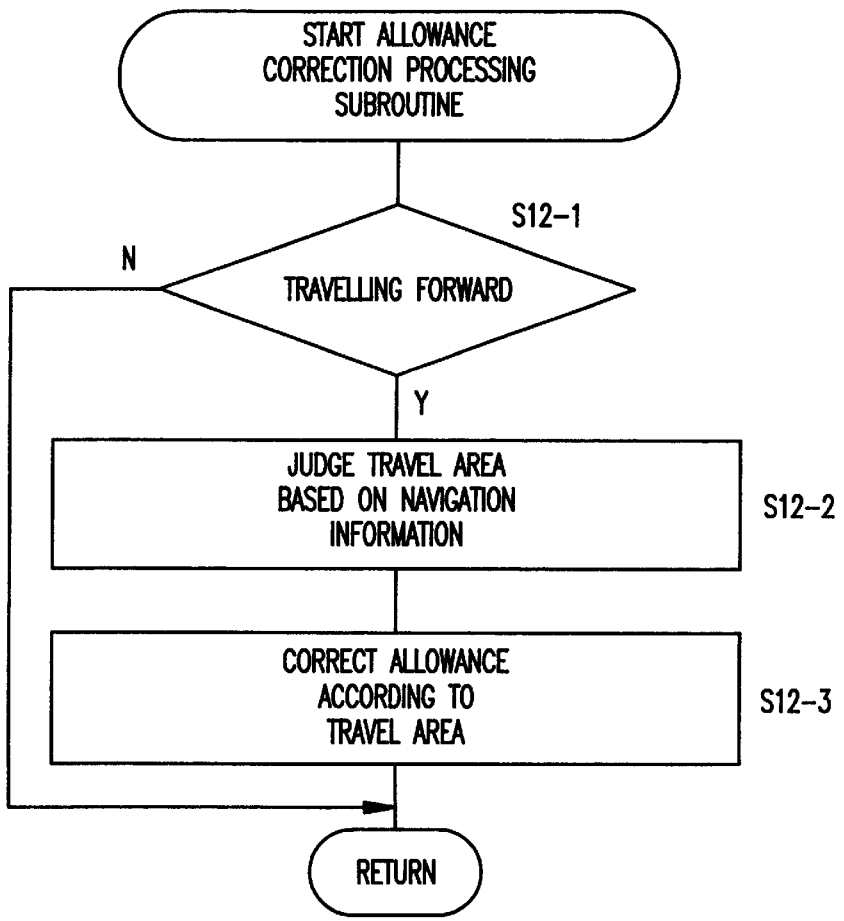
FIG. 13 shows a subroutine for allowance correction in the second embodiment of the invention.

Next, the subroutine for the allowance correction, i.e, step S12 in FIG. 12, will be described with reference to FIGS. 13 and 14.

The torque variation estimation processing means 92 (FIG. 1) of the allowance correction processing means judges whether or not the vehicle is traveling forward, then if traveling forward, reads navigation information as travel environment and judges the travel area based on the navigation information. In this case, as travel area, it is judged whether it is an urban road, a congested road, a mountain road, an uphill road, a downhill road, an expressway, or the like.

Then, the torque variation estimation processing means 92 estimates whether or not the transmission torque will tend to vary easily during travel based on the travel area, and how much it will vary in the case where it finds that the transmission torque tends to vary easily. The pinching pressure change processing means 93 of the allowance correction processing means corrects the allowance m based on the estimation made by the torque variation estimation processing means 92, and changes the pinching pressure accordingly.

For instance, when the travel area is judged to be an urban road, it is estimated that the transmission torque will hardly vary during travel, and the allowance m is not corrected. When the travel area is judged to be a congested road, it is estimated that there is only a small possibility of a sudden change in the degree to which the accelerator pedal is depressed, for example, so that the transmission torque will hardly vary during travel. As a result, the allowance m is corrected by a correction value $\delta 11$ and reduced to m$-\delta 11$. When the travel area is judged to be a mountain road, it is estimated that the degree of accelerator pedal depression will be medium to high, that is, the degree of throttle opening will be medium to high, so that the accelerator pedal will be depressed and released frequently, and the transmission torque will tend to vary easily during travel. As a result, the allowance m is corrected by a correction value $\delta 12$ and increased to m+$\delta 12$. When the travel area is judged to be an uphill road, it is estimated that degree of the throttle opening will be medium to high, so that the accelerator pedal will be depressed and released frequently, and the transmission torque will tend to vary easily during travel. As a result, the allowance m is corrected by a correction value $\delta 13$ and increased to m+$\delta 13$. When the travel area is judged to be a downhill road, it is estimated that there is only a small possibility of a sudden change in degree of depression of the accelerator pedal, for example, and that the transmission torque will hardly vary during travel. As a result, the allowance m is corrected by a correction value $\delta 14$ and reduced to m$-\delta 14$. When the travel area is judged to be an expressway, it is estimated that there will be only a small possibility of a sudden change in the degree of depression of the accelerator pedal, for example, and that transmission torque will hardly vary during travel. As a result, the allowance m is corrected by a correction value $\delta 15$ and reduced to m$-\delta 15$. The correction values $\delta 11$ to $\delta 15$ are set previously according to the degree of the transmission torque variation.

Next, the flowchart of FIG. 13 will be described for the second embodiment.

Step S12-1: It is judged whether or not the vehicle is traveling forward. If the vehicle is traveling forward, the subroutine proceeds to step S12-2, and when the vehicle is not traveling forward, the subroutine returns to the start.

Step S12-2: The travel area is judged based on the navigation information.

Step S12-3: The allowance m is corrected according to the travel area, and the subroutine returns to the start.

Figures 15, 16:
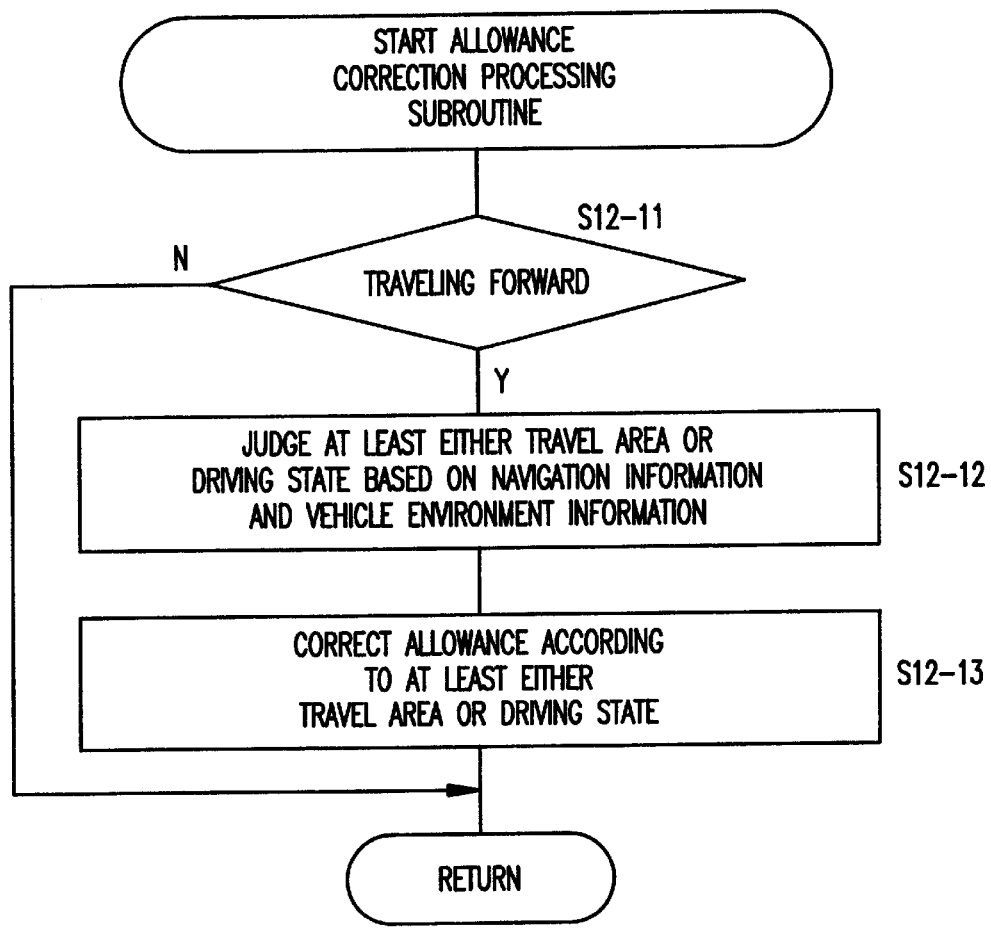
FIG. 15 shows a subroutine for allowance correction in a third embodiment of the invention.
FIG. 16 shows a correction value table used in the third embodiment of the invention.

A third embodiment of the invention will now be described with reference to FIGS. 15 and 16.

The torque variation estimation processing means 92 (FIG. 1) of the allowance correction processing means judges whether or not the vehicle is traveling forward, and if traveling forward, reads navigation information and vehicle environment information as travel environment, and judges at least either the travel area based on the navigation information or environment information. In judging the travel area, it is judged whether the travel area is an expressway, an urban road, or the like. In judging the driving state, it is determined that there is no vehicle ahead (no vehicle ahead), that there is a vehicle ahead (vehicle ahead), or that, during a stop, there is a vehicle ahead (vehicle ahead during a stop), or the like, based on the lane for proceeding forward. When only the travel area is to be judged, only navigation information is read, and when only the driving state is to be judged, only the vehicle environment information is read.

Then, the torque variation estimation processing means 92 estimates whether or not the transmission torque tends to vary easily during travel based on at least either the travel area or the driving state, and how much it will vary in the case where the transmission torque is found to tend to vary easily. The pinching pressure change processing means 93 of the allowance correction processing means corrects the allowance m based on the estimation made by the torque variation estimation processing means 92, and changes the pinching pressure accordingly.

For example, when it is judged that the vehicle travels on an expressway, and there is no vehicle ahead, it is estimated that the vehicle will travel mostly at a constant vehicle speed V, and there is only a small possibility of sudden acceleration, so that the transmission torque will hardly vary during travel. As a result, the allowance m is corrected by a correction value $\delta 21$ and reduced to m−$\delta 21$. When it is judged that the vehicle travels on an expressway and there is a vehicle ahead, it is estimated that there is a large possibility of sudden acceleration for passing the preceding vehicle, so that the transmission torque will tend to vary easily during travel. As a result, the allowance m is corrected by a correction value $\delta 22$ and increased to m+$\delta 22$. When it is judged that the vehicle travels on an urban road, it is estimated that the transmission torque will hardly vary during travel. As a result, the allowance m is not corrected. When it is judged that there is a vehicle ahead during a stop, it is estimated that there is only a small possibility of sudden take-off, so that the transmission torque will hardly vary during travel. As a result, the allowance m is corrected by a correction value $\delta 23$ and reduced to m+$\delta 23$. The correction values $\delta 21$ to $\delta 23$ are preset according to the degree of the transmission torque variation.

Next, the flowchart of FIG. 15 will be described.

Step S12-11: It is judged whether or not the vehicle is traveling forward. If the vehicle is traveling forward, the subroutine proceeds to step S12-12, and if the vehicle is not traveling forward, the subroutine returns to the start.

Step S12-12: At least either the travel area is judged based on the navigation information or the driving state is judged based on the vehicle environment information.

Step S12-13: The allowance m is corrected according to at least either the travel area or the driving state, and the subroutine returns to the start.

Next, a fourth embodiment of the invention will be described.

Figures 17, 18:
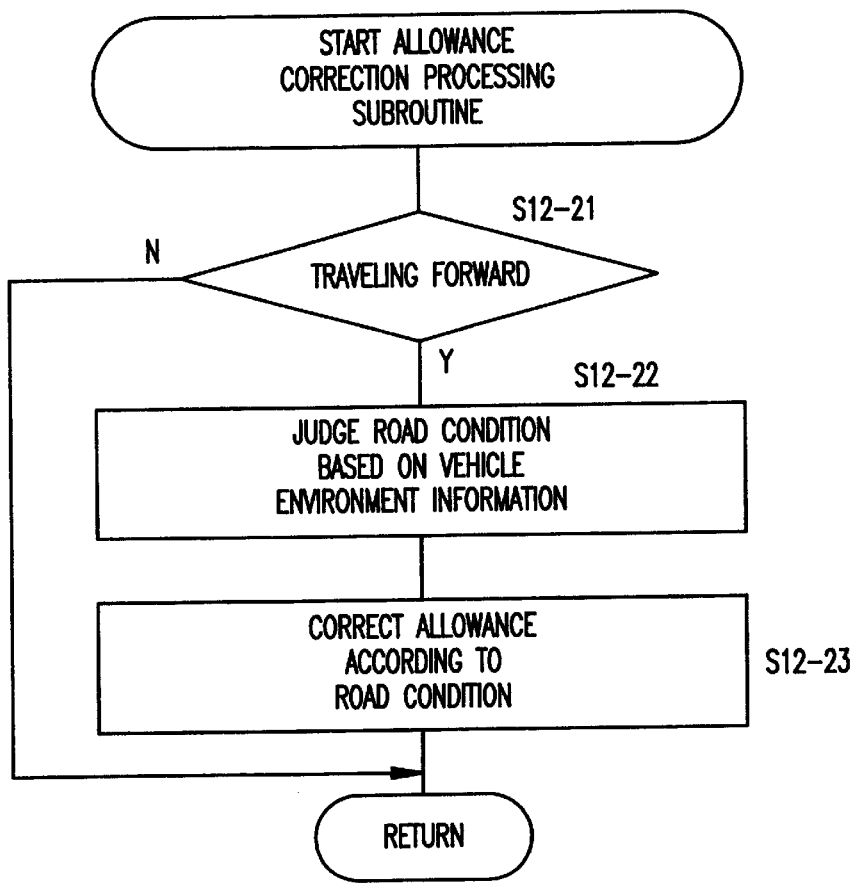
FIG. 17 shows a subroutine for allowance correction processing in a fourth embodiment of the invention.
FIG. 18 shows a correction value table used in the fourth embodiment of the invention.

FIG. 17 shows a subroutine for the allowance correction in the fourth embodiment of the invention, and FIG. 18 shows a table of correction values used in the fourth embodiment of the invention.

The torque variation estimation processing means 92 (FIG. 1) of the allowance correction processing means judges whether or not the vehicle is traveling forward, and if traveling forward, reads as travel environment the state of road surface from the vehicle environment information, and judges the road surface condition based on the state of road surface. In this case, the road surface is judged to be an asphalt road surface, a concrete road surface, a gravel road surface (gravel road), an ice and snow covered road surface (snow covered road or snow and ice mixture covered road), a smoothly frozen road surface, or the like. Since the state of road surface is also recorded as road data in the current position detection section 15 (FIG. 3), the road surface condition may be judged by reading the navigation information.

Then, the torque variation estimation processing means 92 estimates whether or not the transmission torque will tend to vary easily during travel based on the road surface condition, and how much it will vary in the case where the transmission torque will tend to vary easily. The pinching pressure change processing means 93 of the allowance correction processing means corrects the allowance m based on the estimation made by the torque variation estimation processing means 92, and changes the pinching pressure accordingly.

For example, when the road surface condition is judged to be an asphalt road surface or a concrete road surface, it is estimated that the transmission torque will hardly vary during travel. As a result, the allowance m is not corrected. When the road surface condition is judged to be a gravel road surface, it is estimated that the wheel will receive resistance when riding on the gravel and that the reaction force received from the road surface will be large, so that the transmission torque will tend to vary easily during travel. As a result, the allowance m is corrected by a correction value $\delta 31$ and increased to m+$\delta 31$. When the road surface condition is judged to be an ice and snow covered road surface, it is estimated that the wheel will receive resistance when riding over accumulated snow and that the reaction force received from the road surface will be large, so that the transmission torque will tend to vary easily during travel. As a result, the allowance m is corrected by a correction value $\delta 32$ and increased to m+$\delta 32$. When the road surface condition is judged to be a smoothly frozen road surface, it is estimated that the coefficient of friction of the road surface is small, that the torque which can be transmitted by the drive wheels will be small, and that the reaction force received from the road surface will be small, so that the transmission torque will hardly vary during travel. As a result, the allowance m is corrected by a correction value $\delta 33$ and reduced to m−$\delta 33$. The correction values $\delta 31$ to $\delta 33$ are preset for the degree of the transmission torque variation.

Next, the flowchart of FIG. 17 will be described.

Step S12-21: It is judged whether or not the vehicle is traveling forward. If the vehicle is traveling forward, the subroutine proceeds to step S12-22, and if the vehicle is not traveling forward, the subroutine returns to the start.

Step S12-22: The road surface condition is judged based on the vehicle environment information.

Step S12-23: The allowance m is corrected according to the travel area, and the subroutine returns to the start.

The invention is not limited to the aforementioned embodiments, but can be variously modified within the spirit of the invention, and such modified embodiments are not excluded from the scope of the invention.

What is claimed is:

1. An automatic transmission control apparatus for a vehicle comprising:
   a primary pulley;
   a secondary pulley;
   a belt stretched around the primary pulley and the secondary pulley;
   travel environment determination means for determining at least one parameter related to travel environment of the vehicle;

torque variation estimation means for estimating variation in transmission torque during travel, based on the determined travel environment;

transmission control means for generating a shift signal;

primary pulley regulating means for regulating said primary pulley so as to change effective diameters of the primary and secondary pulleys, responsive to the shift signal;

pinching pressure change processing means for determining a pinching pressure in accordance with the estimated variation in transmission torque; and pinching pressure regulating means for regulating said secondary pulley to change pinching pressure exerted on said belt by said secondary pulley in accordance with the determined pinching pressure.

2. The automatic transmission control apparatus according to claim 1 wherein said pinching pressure change processing means determines a pinching pressure including an allowance m and changes said allowance m in accordance with the estimated variation in transmission torque.

3. The automatic transmission control apparatus according to claim 2 wherein said transmission control means refers to a gear shifting diagram stored in memory, applies a selecting shifting range, a detected vehicle speed, a detected throttle opening and a detected engine speed to the gear shifting diagram to determine a target engine speed and generates the shift signal in accordance with the determined target engine speed.

4. The automatic transmission control apparatus according to claim 3 wherein said transmission control means has an adaptive control mode wherein said transmission control means selects one of plural gear shifting diagrams in accordance with the estimated variation in transmission torque.

5. The automatic transmission control apparatus according to claim 4 wherein a different correction factor is assigned to each of the plural gear shifting diagrams, and wherein said pinching pressure change processing means changes said allowance m by said correction factor.

6. The automatic transmission control apparatus according to claim 5 wherein said transmission control means also has a normal control mode wherein said transmission control means selects a gear shifting diagram independent of the estimated variation in transmission torque.

7. The automatic transmission control apparatus according to claim 1, wherein the pinching pressure change processing means increases the determined pinching pressure when the torque variation estimation means estimates that transmission torque will tend to vary easily and lowers the determined pinching pressure when the torque variation estimation means estimates that the transmission torque will tend to hardly vary.

8. The automatic transmission control apparatus according to claim 7, wherein the torque variation estimation processing means estimates that the transmission torque will hardly vary in a travel environment where it is estimated that a sudden change of throttle opening will not occur.

9. The automatic transmission control apparatus according to claim 7, wherein the torque variation estimation processing means estimates that the transmission torque will tend to vary easily in a travel environment where it is estimated that a degree of throttle opening will be medium to high, and that the accelerator pedal will be engaged and released frequently.

10. The automatic transmission control apparatus according to claim 7, wherein the torque variation estimation processing means estimates that the transmission torque will hardly vary in a travel environment where it is estimated that there is a low probability of sudden acceleration and that the transmission torque will tend to vary easily in a travel environment where it is estimated that there is a high probability of sudden acceleration.

11. The automatic transmission control apparatus according to claim 7, wherein the torque variation estimation processing means estimates that the transmission torque will tend to vary easily in a travel environment where it is estimated that the reaction force received from a road surface will be large and that the transmission torque will tend to hardly vary in a travel environment wherein it is estimated that the reaction force received from a road surface will be small.

12. The automatic transmission control apparatus according to claim 10, wherein the torque variation estimation processing means estimates that there is a low probability of sudden acceleration when there is no vehicle ahead during travel on an expressway and that there is a high probability of sudden acceleration when there is a vehicle ahead during travel on an expressway.

13. The automatic transmission control apparatus according to claim 10, wherein the torque variation estimation processing means estimates that there is a low probability of sudden acceleration when there is a vehicle ahead during a stop.

14. The automatic transmission control apparatus according to claim 8, wherein the at least one parameter is an expressway.

15. The automatic transmission control apparatus according to claim 11, wherein it is estimated that the reaction force received from a road surface will be large when the road surface is a gravel road surface.

16. The automatic transmission control apparatus according to claim 11, wherein it is estimated that the reaction force received from a road surface will be large when the road surface is an ice and/or snow covered road surface.

17. The automatic transmission control apparatus according to claim 11, wherein it is estimated that the reaction force received from a road surface will be small when the road surface is a smoothly frozen road surface.

18. The automatic transmission control apparatus according to claim 1, wherein the torque variation estimation processing means estimates the transmission torque variation in accordance with selection of a shift schedule based on the determined travel environment.

19. The automatic transmission control apparatus according to claim 1, wherein the at least one parameter is a travel area.

20. The automatic transmission control apparatus according to claim 1, wherein the at least one parameter is road congestion.

21. The automatic transmission control apparatus according to claim 1, wherein the at least one parameter is a downhill slope.

22. The automatic transmission control apparatus according to claim 1, wherein the at least one parameter is travel area and/or driving state.

23. The automatic transmission control apparatus according to claim 1, wherein the at least one parameter is a mountain road.

24. The automatic transmission control apparatus according to claim 1, wherein the at least one parameter is an uphill slope.

25. The automatic transmission control apparatus according to claim 1, wherein the at least one parameter is road surface condition.

26. The automatic transmission control apparatus according to claim 1, wherein the travel environment determination means determines the at least one parameter is based on information pertaining to operation of the vehicle.

27. The automatic transmission control apparatus according to claim 1 wherein said pulleys each comprise a movable sheave, wherein said primary pulley regulating means regulates said primary pulley by movement of the movable sheave of the primary pulley and said pinching pressure regulating means regulates said secondary pulley by movement of the movable sheave of said secondary pulley.

28. The automatic transmission control apparatus according to claim 27 wherein said primary pulley regulating means and pinching pressure regulating means are hydraulic actuators comprising the movable sheaves, serving as pistons, moved axially responsive to hydraulic pressure.

29. The automatic transmission control apparatus according to claim 1 wherein said pinching pressure regulating means regulates said second pulley when the transfer of rotation is from the engine to the primary pulley.

30. An automatic transmission control method for controlling a transmission apparatus mounted in a vehicle and comprising primary and secondary pulleys and a belt stretched around the pulleys, said control method comprising:

determining at least one parameter related to travel environment of the vehicle;

estimating variation in transmission torque during travel, based on the determined travel environment;

generating a shift signal;

regulating the primary pulley so as to change effective diameters of the pulleys, responsive to the shift signal;

determining a pinching pressure in accordance with the estimated variation in transmission torque; and regulating the secondary pulley to change the pinching pressure exerted on the belt by the secondary pulley in accordance with the determined pinching pressure.

31. The automatic transmission control method according to claim 30 wherein the secondary pulley is regulated to change the pinching pressure when the transfer of rotation is from the engine to the primary pulley.

32. A machine-readable medium having encoded thereon a program for execution of the transmission control method of claim 30.

* * * * *